US007136490B2

United States Patent
Martinez et al.

(12) United States Patent
(10) Patent No.: US 7,136,490 B2
(45) Date of Patent: Nov. 14, 2006

(54) ELECTRONIC PASSWORD WALLET

(75) Inventors: Anthony Edward Martinez, Spicewood, TX (US); Michael D. Rahn, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 840 days.

(21) Appl. No.: 10/082,744

(22) Filed: Feb. 21, 2002

(65) Prior Publication Data

US 2003/0159071 A1    Aug. 21, 2003

(51) Int. Cl.
- *H04L 9/00* (2006.01)
- *H04L 9/32* (2006.01)
- *H04K 1/00* (2006.01)

(52) U.S. Cl. ............... 380/284; 713/183; 713/184; 726/8

(58) Field of Classification Search ............... 380/284
See application file for complete search history.

(56) References Cited

U.S. PATENT DOCUMENTS

| | | | | |
|---|---|---|---|---|
| 5,345,549 | A * | 9/1994 | Appel et al. | 715/741 |
| 5,935,251 | A * | 8/1999 | Moore | 726/18 |
| 5,936,220 | A | 8/1999 | Hoshino et al. | |
| 6,000,033 | A * | 12/1999 | Kelley et al. | 713/201 |
| 6,006,333 | A * | 12/1999 | Nielsen | 713/202 |
| 6,044,155 | A * | 3/2000 | Thomlinson et al. | 713/155 |
| 6,182,229 | B1 * | 1/2001 | Nielsen | 713/202 |
| 6,192,380 | B1 * | 2/2001 | Light et al. | 715/505 |
| 6,250,557 | B1 | 6/2001 | Forslund et al. | |
| 6,273,335 | B1 | 8/2001 | Sloan | |
| 6,412,073 | B1 * | 6/2002 | Rangan | 726/5 |
| 6,441,834 | B1 * | 8/2002 | Agassi et al. | 715/764 |
| 6,484,263 | B1 * | 11/2002 | Liu | 713/201 |
| 2002/0062342 | A1 * | 5/2002 | Sidles | 709/203 |
| 2002/0066039 | A1 * | 5/2002 | Dent | 713/202 |
| 2002/0095673 | A1 * | 7/2002 | Leung et al. | 725/25 |
| 2003/0001013 | A1 * | 1/2003 | Akamine | 235/454 |

OTHER PUBLICATIONS

"Entering Web Information More Easily", by Microsoft, published in MS Internet Explorer ver.5.00 in help file autocomp.htm, 1 page.
"To adjust AutoComplete settings", by Microsoft, published in MS Internet Explorer ver.5.00 in help file autocoff.htm, 1 page.
"Using online passwords" from Intuit Corporations Quicken Home and Business 2001 help file, 2 pages.

* cited by examiner

*Primary Examiner*—Gilberto Barron
*Assistant Examiner*—Virgil Herring
(74) *Attorney, Agent, or Firm*—Robert H. Frantz; David A. Mims, Jr.

(57) ABSTRACT

A convenient and secure system and method for access to any number of password-protected computer applications, web sites and forms without adding to the user cognitive load and without circumventing the inherent security of such password-protection schemes. An existing password field on a device display is overlaid with password wallet pop-up field which allows a wallet "master" key to unlock the wallet. An application-specific and/or user-specific password is automatically retrieved from the wallet and entered into the password field with no other user action required.

19 Claims, 6 Drawing Sheets

ELECTRONIC PASSWORD WALLET

CROSS-REFERENCE TO RELATED APPLICATIONS (CLAIMING BENEFIT UNDER 35 U.S.C. 120)

Not applicable.

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

Not applicable

BACKGROUND OF THE INVENTION

1. Field of the Invention

This invention relates to the fields of computer program security, user access control, user interface methods, and online authentication, and more specifically to the field of password and personal identification number protection and management.

2. Background of the Invention

Many websites require users to supply a screen name or user name ("user ID") and a user-specific password in order to authenticate the user and provide account security. Similarly, many application programs, such as word processors with password protected files, financial management software, and e-mail client programs also require a user ID and a password in order to access certain files and accounts.

In many cases, the password is generated by the supplier of the service or the application program itself. In such cases, the user may or may not be able to modify that password to be something easily remembered. This can result in a single user having many different user names and passwords, each of which is associated with a single web site or application program.

In situations where the user is provided the capability to define his or her own password, it is unwise to use a common password for all of his or her access points for web sites and application programs. For example, if an online financial or stock tracking website requires a user to set a password, it would be unwise for that user to use the same password as he may use for his online banking personal identification number (PIN) or other passwords for other programs and websites, as that password is supplied to the operator of the website and would allow the operator of that website to potentially access his or her other accounts.

Therefore, it remains extremely common for users to have a multitude of passwords, each of which is associated with a different user ID and a different application program or website.

However, it quickly becomes unwieldy for a user to remember all the different user IDs and passwords associated with all the different application programs, accounts, and websites. So, many users keep track of their user IDs and passwords in a written form, such as writing them on a sheet of paper kept in their desk, or by entering them in a word processor or data file in their personal digital assistant ("PDA") or personal computer ("PC").

This approach, though, can cause a security problem in that the piece of paper may be found by an unauthorized user, resulting in unauthorized access to the user's programs and online accounts. The piece of paper can be lost, too, causing unnecessary difficulty to the user in getting new passwords assigned to his or her account. If a user stores his or her passwords in a computer file on a PDA or PC, he may password-protect that file to provide some security, but may find this file is not available as easily as the paper copy in that he must have access to the appropriate platform, a PC or PDA, and the appropriate application program, such as a word processor, to open and view the file.

One attempt at solving this problem has been provided in Microsoft's Internet Explorer ("IE") [™] known as their web form "auto-complete" feature. Using this auto-complete feature, users can automatically complete or fill-in fields in web forms based on previously defined data which is stored by Internet Explorer on a user's local computer. Potentially, this feature can be used to memorize and enter a password field in a website form, thereby relieving the user of having to remember the password for that form or website. In essence, though, this feature circumvents the security of the form's authorization and authentication process because the auto-complete feature of Internet Explorer [™] does not require a password to operate it. So, any person who has access to the user's computer, and therefore access to the user's auto-complete memorized data file, may use Internet Explorer [™] to auto-complete a form, such as a log-on sequence, and subsequently access the user's online accounts and files.

Another attempted solution to this problem has been provided by Intuit's Quicken [™] application program, which provides financial management functions such as checkbook balancing, check tracking and online bill payment. Since users may have several different bank accounts and several different online payment accounts, Quicken provides a "PIN vault" which is activated automatically during various online transactions conducted via the program which require the entry of a user or account password. A user may configure multiple passwords in the PIN vault, and then use a single password to allow Quicken to automatically enter each password specific to the online transaction being performed.

While this approach provides for enhanced security of the PIN vault contents and convenience to the user, this function is tightly coupled to the Quicken application program itself (e.g. it is a native function of Quicken). As such, the PIN vault is not usable or accessible by other application programs, such as a general purpose web browser. This, then, may lead the user to resort to the older methods of writing down all of his or her passwords and user IDs, or storing them in a computer file.

Therefore, there is a need in the art for a system and method which provides a centralized, secure password storage facility, with quick and easy user access of those passwords without circumventing security measures such as log-on procedures. Additionally, there is a need in the art for this new system and method to provide user password accessibility across applications, web sites and web form instead of being usable only for specific applications or websites, in order to increase it's usefulness and efficiency.

BRIEF DESCRIPTION OF THE DRAWINGS

The following detailed description when taken in conjunction with the figures presented herein provide a complete disclosure of the invention.

SUMMARY OF THE INVENTION

An electronic password wallet provides quick and easy access to any number of password-protected computer applications and web sites in a secure fashion without adding to the user cognitive load and without circumventing the inherent security of such password-protection schemes. The invention achieves this by overlaying an existing password field on a device display with password wallet pop-up field. The pop-up field allows a common "master" key or password to unlock the password wallet, regardless of host application, form, or web site being accessed.

When the password wallet master key has been correctly entered by the user into the wallet pop-up, the application-specific and/or user-specific password is automatically retrieved from the password wallet and entered into the application's password field with no other user action required. If the application, web site or form is not previously known to the wallet, the user is provided an opportunity to define a new application-user_ID-password combination for future accesses.

Using the invention, the user needs to only remember the wallet master key, does not have to remember a multitude of passwords and user ID's for a plurality of application programs and web sites, and does not have to cut-and-paste or retype the password if looked up from a written or electronic storage of these passwords. The master wallet key provides for security of the passwords themselves, and the structure of the preferred embodiment provides access to the wallet across application programs, web sites, and forms.

DETAILED DESCRIPTION OF THE INVENTION

The electronic password wallet is preferably realized as a feature or addition to the software already found present on well-known computing platforms such as personal computers, web servers, and web browsers. These common computing platforms can include personal computers as well as portable computing platforms, such as personal digital assistants ("PDA"), web-enabled wireless telephones, and other types of personal information management ("PIM") devices.

Therefore, it is useful to review a generalized architecture of a computing platform which may span the range of implementation, from a high-end web or enterprise server platform, to a personal computer, to a portable PDA or web-enabled wireless phone.

Figure 1:
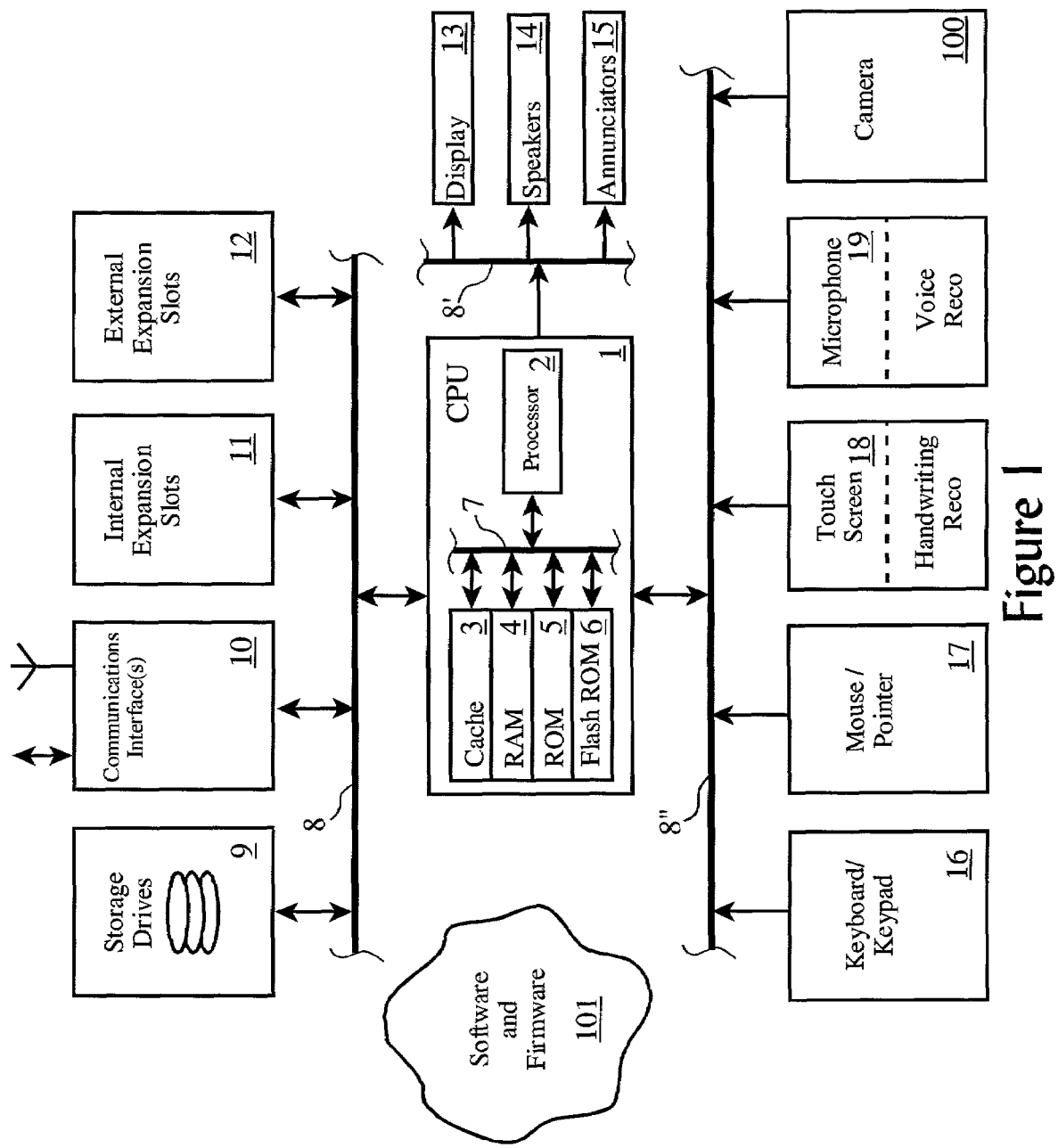
FIG. 1 depicts a generalized computing platform architecture, such as a personal computer, server computer, personal digital assistant, web-enabled wireless telephone, or other processor-based device.

Turning to FIG. 1, a generalized architecture is presented including a central processing unit (1) ("CPU"), which is typically comprised of a microprocessor (2) associated with random access memory ("RAM") (4) and read-only memory ("ROM") (5). Often, the CPU (1) is also provided with cache memory (3) and programmable FlashROM (6). The interface (7) between the microprocessor (2) and the various types of CPU memory is often referred to as a "local bus", but also may be a more generic or industry standard bus.

Many computing platforms are also provided with one or more storage drives (9), such as a hard-disk drives ("HDD"), floppy disk drives, compact disc drives (CD, CD-R, CD-RW, DVD, DVD-R, etc.), and proprietary disk and tape drives (e.g., Iomega Zip [™] and Jaz [™], Addonics SuperDisk [™], etc.). Additionally, some storage drives may be accessible over a computer network.

Many computing platforms are provided with one or more communication interfaces (10), according to the function intended of the computing platform. For example, a personal computer is often provided with a high speed serial port (RS-232, RS-422, etc.), an enhanced parallel port ("EPP"), and one or more universal serial bus ("USB") ports. The computing platform may also be provided with a local area network ("LAN") interface, such as an Ethernet card, and other high-speed interfaces such as the High Performance Serial Bus IEEE-1394.

Computing platforms such as wireless telephones and wireless networked PDA's may also be provided with a radio frequency ("RF") interface with antenna, as well. In some cases, the computing platform may be provided with an infrared data arrangement (IrDA) interface, too.

Computing platforms are often equipped with one or more internal expansion slots (11), such as Industry Standard Architecture (ISA), Enhanced Industry Standard Architecture (EISA), Peripheral Component Interconnect (PCI), or proprietary interface slots for the addition of other hardware, such as sound cards, memory boards, and graphics accelerators.

Additionally, many units, such as laptop computers and PDA's, are provided with one or more external expansion slots (12) allowing the user the ability to easily install and remove hardware expansion devices, such as PCMCIA cards, SmartMedia cards, and various proprietary modules such as removable hard drives, CD drives, and floppy drives.

Often, the storage drives (9), communication interfaces (10), internal expansion slots (11) and external expansion slots (12) are interconnected with the CPU (1) via a standard or industry open bus architecture (8), such as ISA, EISA, or PCI. In many cases, the bus (8) may be of a proprietary design.

A computing platform is usually provided with one or more user input devices, such as a keyboard or a keypad (16), and mouse or pointer device (17), and/or a touch-screen display (18). In the case of a personal computer, a full size keyboard is often provided along with a mouse or pointer device, such as a track ball or TrackPoint [™]. In the case of a web-enabled wireless telephone, a simple keypad may be provided with one or more function-specific keys. In the case of a PDA, a touch-screen (18) is usually provided, often with handwriting recognition capabilities.

Additionally, a microphone (19), such as the microphone of a web-enabled wireless telephone or the microphone of a personal computer, is supplied with the computing platform. This microphone may be used for simply reporting audio and voice signals, and it may also be used for entering user choices, such as voice navigation of web sites or auto-dialing telephone numbers, using voice recognition capabilities.

Many computing platforms are also equipped with a camera device (100), such as a still digital camera or full motion video digital camera.

One or more user output devices, such as a display (13), are also provided with most computing platforms. The display (13) may take many forms, including a Cathode Ray Tube ("CRT"), a Thin Flat Transistor (TFT) array, or a simple set of light emitting diodes ("LED") or liquid crystal display ("LCD") indicators.

One or more speakers (14) and/or annunciators (15) are often associated with computing platforms, too. The speakers (14) may be used to reproduce audio and music, such as the speaker of a wireless telephone or the speakers of a personal computer. Annuciators (15) may take the form of simple beep emitters or buzzers, commonly found on certain devices such as PDAs and PIMs.

These user input and output devices may be directly interconnected (8', 8") to the CPU (1) via a proprietary bus structure and/or interfaces, or they may be interconnected through one or more industry open buses such as ISA, EISA, PCI, etc.

The computing platform is also provided with one or more software and firmware (101) programs to implement the desired functionality of the computing platforms.

Figure 2:
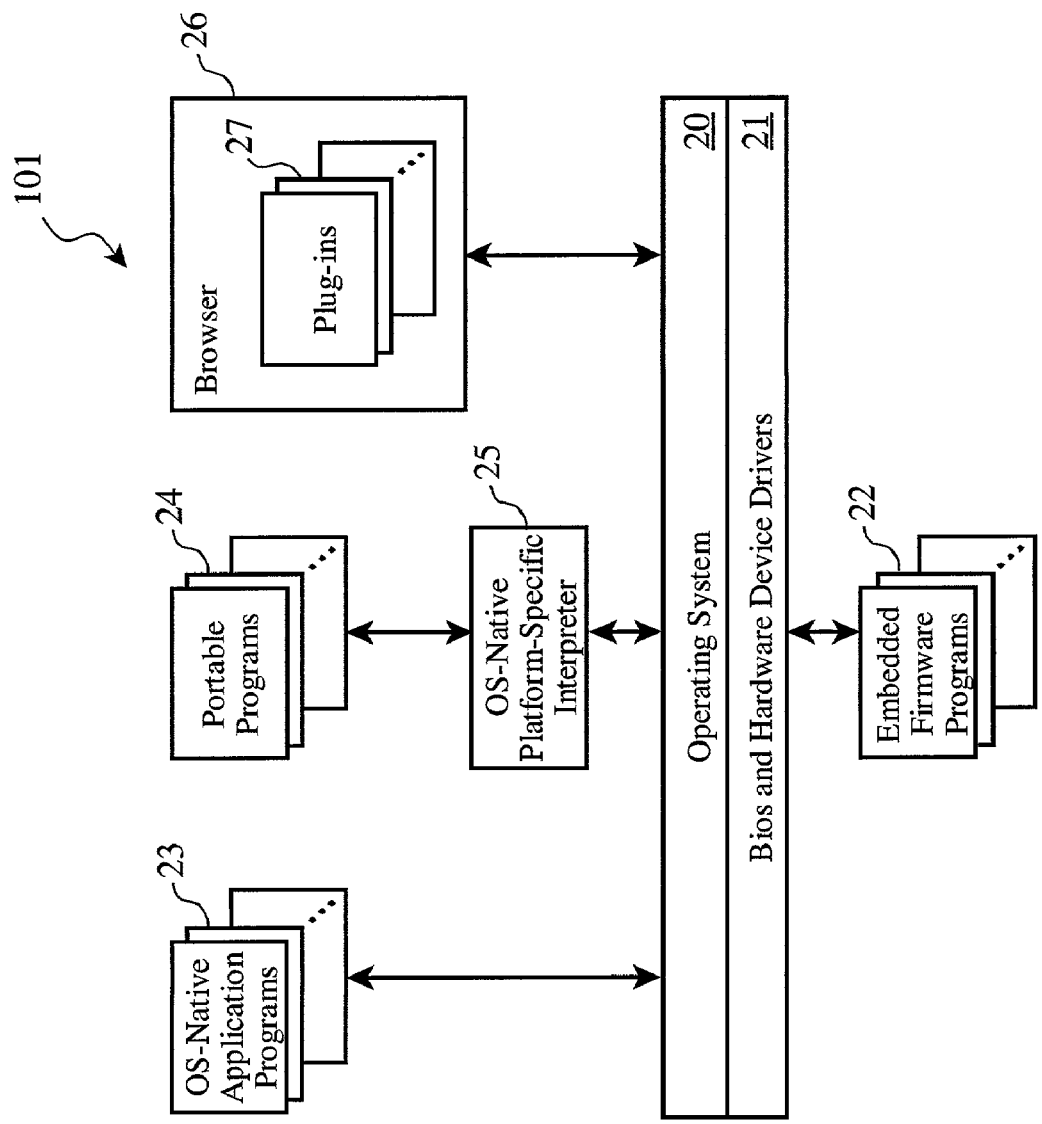
FIG. 2 shows a generalized organization of software and firmware associated with the generalized architecture of FIG. 1.

Turning to now FIG. 2, more detail is given of a generalized organization of software and firmware (101) on this range of computing platforms. One or more operating system ("OS") native application programs (23) may be provided on the computing platform, such as word processors, spreadsheets, contact management utilities, address book, calendar, email client, presentation, financial and bookkeeping programs.

Additionally, one or more "portable" or device-independent programs (24) may be provided, which must be interpreted by an OS-native platform-specific interpreter (25), such as Java [™] scripts and programs.

Often, computing platforms are also provided with a form of web browser or micro-browser (26), which may also include one or more extensions to the browser such as browser plug-ins (27).

The computing device is often provided with an operating system (20), such as Microsoft Windows [™], UNIX, IBM OS/2 [™], LINUX, MAC OS [™] or other platform specific operating systems. Smaller devices such as PDA's and wireless telephones may be equipped with other forms of operating systems such as real-time operating systems ("RTOS") or Palm Computing's PalmOS [™].

A set of basic input and output functions ("BIOS") and hardware device drivers (21) are often provided to allow the operating system (20) and programs to interface to and control the specific hardware functions provided with the computing platform.

Additionally, one or more embedded firmware programs (22) are commonly provided with many computing platforms, which are executed by onboard or "embedded" microprocessors as part of the peripheral device, such as a microcontroller or a hard drive, a communication processor, network interface card, or sound or graphics card.

As such, FIGS. 1 and 2 describe in a general sense the various hardware components, software and firmware programs of a wide variety of computing platforms, including but not limited to personal computers, PDAs, PIMs, web-enabled telephones, and other appliances such as WebTV [™] units. As such, we now turn our attention to disclosure of the present invention relative to the processes and methods preferably implemented as software and firmware on such a computing platform. It will be readily recognized by those skilled in the art that the following methods and processes may be alternatively realized as hardware functions, in part or in whole, without departing from the spirit and scope of the invention.

Figure 3:
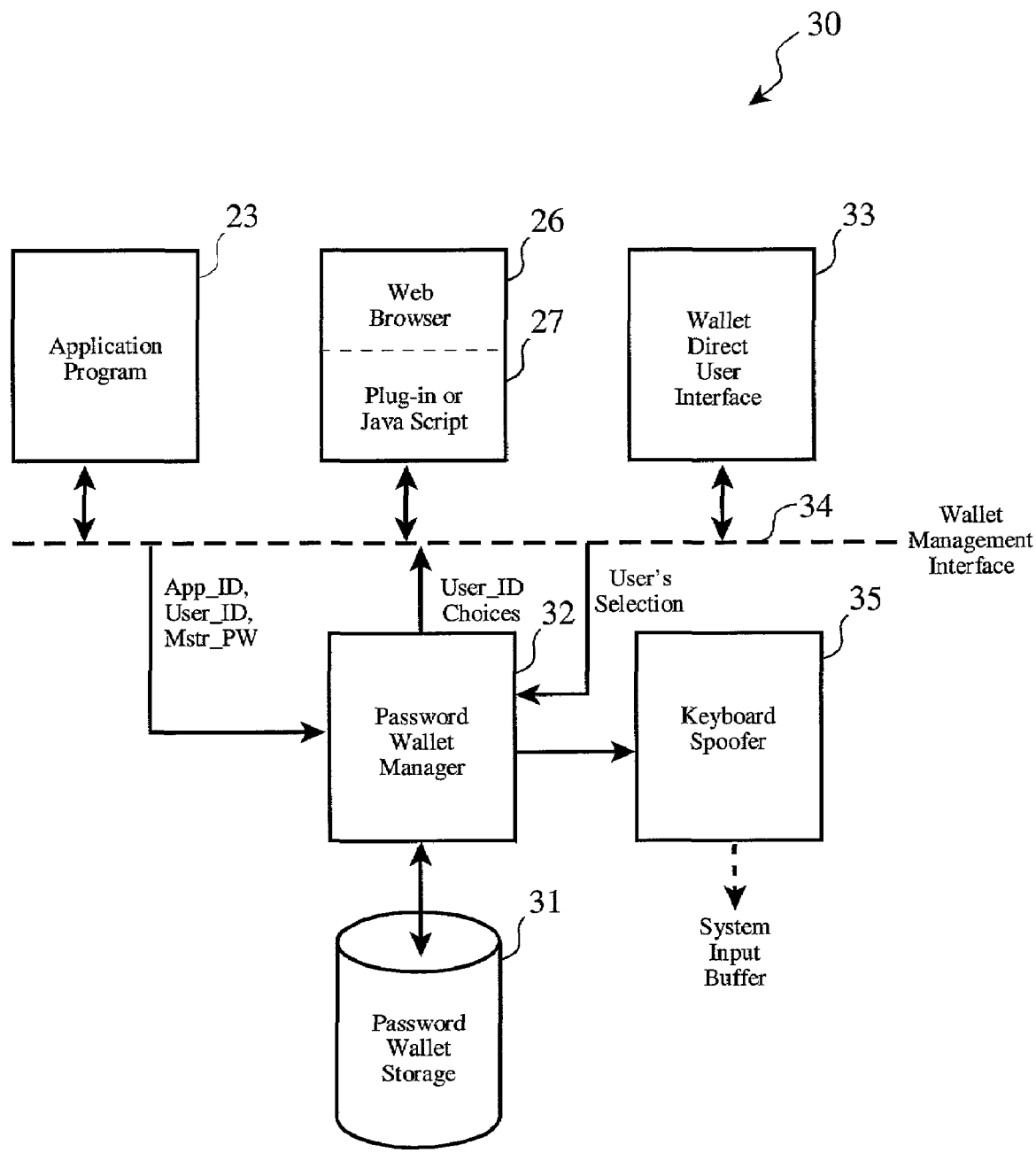
FIG. 3 shows an organization of application programs, browsers and the components of the invention according to the preferred embodiment.

Turning to FIG. 3, the arrangement according to the present invention is shown. Application programs (23) and web browsers (26) may be modified or extended to interface (34) to a password wallet manager (32). The password wallet manager (32) may access a password wallet storage (31), such as an encrypted database file. A wallet direct user interface program (33) may also be provided to allow the user to directly access a stored password via the password wallet manager (32) without using an application program (23) or web browser (26).

The generalized interface (34) for the password wallet manager (32) provides for an application program, web browser, or web browser plug-in to request an application-specific and possibly user_ID-specific password from the password wallet. It can do this by making a request through the interface (34) supplying an identifier for the requesting application, and if available, a user ID. The master wallet key (entered by the user) may also be provided through this interface to password wallet manager (32), and alternatively a screen location where the application password field is located.

In a process described in more detail later, the password wallet manager (32) verifies the master wallet key is correct, and then accesses the password wallet storage (31) to retrieve the password associated with the application and/or the user ID.

This password is then provided back via the wallet interface (34) to the requesting application program, web browser, or plug-in for input, or preferably input directly through a method such as spoofing the keyboard buffer (e.g. auto-typing) optionally using the screen location provided by the requesting application. "Spoofing" is a process whereby a program, such as the wallet manager, may directly write characters into the keyboard buffer (or similar input queue), which appears to the system to have been "typed" by the user. This allows the invention to automatically enter an input on behalf of a user without the user having to make keystrokes, such as retyping the password or cutting-and-pasting the password into the field.

In an enhanced embodiment of the invention, the user is allowed to type the actual password for the application, web site or form into the field normally intended to receive the master key input. The invention, then, can search the wallet storage to determine if a matching application-user_ID-password combination exists, and if so, directly input the password value (typed by the user) into the requesting application. If there is no matching combination, the invention may assume that this was a failed attempt to enter the master key value, and may re-prompt the user to enter the master key value or simply terminate. This enhancement to the invention allows a user who is familiar with the particular password needed to bypass the invention without having the move his mouse or pointer to close the pop-up dialogue, while maintaining the security provided by the wallet mechanism.

The wallet direct user interface (33) is also preferably provided, which also interfaces to the password wallet manager (32) via the generalized interface (34). This function allows the user to view all defined passwords, edit passwords, add or delete passwords, as desired. It may also allow the user to create and modify the master key value for the password wallet.

Figure 4:
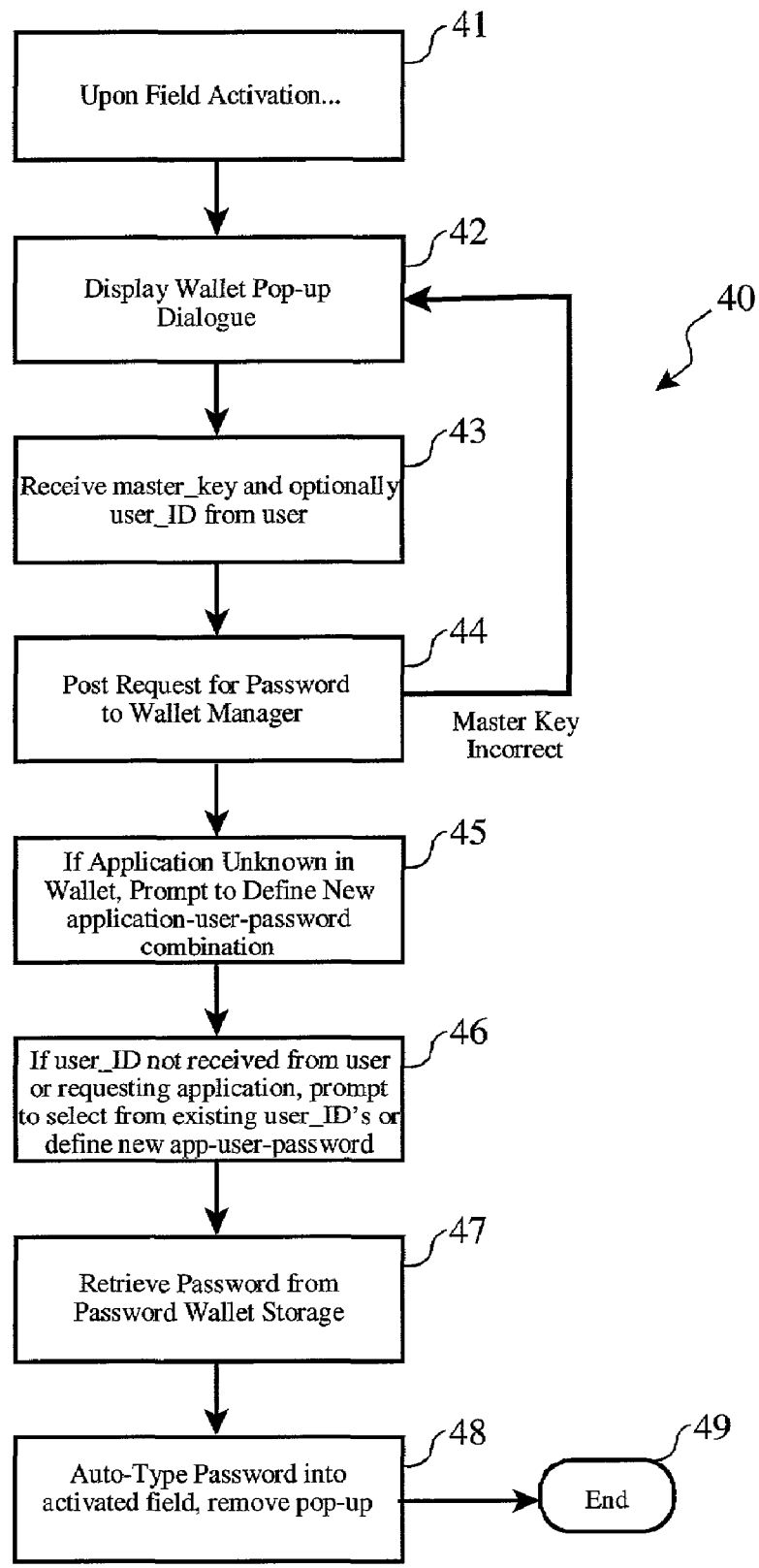
FIG. 4 illustrates the logical process of the invention for automatically accessing the electronic password wallet when completing password fields.

Turning now to FIG. 4, the basic process or method (40) of the invention is shown. Upon field activation (41), such as the mouse or pointer device moving over a password field, a user clicking into a password field, or other activation such as a user right-clicking a pointer or mouse over a field, the wallet pop-up dialogue is displayed (42). For some application programs, activation may be made based upon knowledge that the application program has of a particular field. For web browsers, the field type may provide the indication that the wallet such be activated, such as the Hyper Text Markup Language ("HTML") field type of "password".

The wallet pop-up dialogue allows a user to enter (43) a master key value, and potentially a user ID value if the user ID is not otherwise available or supplied by the application or browsing program.

Next, a request is posted for the application-specific (and potentially user_ID-specific) password to the wallet manager (44). If the wallet manager determines that the master key is incorrect, the wallet pop-up dialogue may be cleared and redisplayed (42), potentially with a warning message that the master key entered is incorrect.

Otherwise, if the master key supplied by the user is correct, then the wallet manager will determine if the application is previously known to the password wallet, such as by searching the password wallet storage (31).

If the application does not have an existing password, and/or user_ID entry, in the password wallet storage (31), then the user may be prompted via the wallet pop-up dialogue to enter and create a new record in the wallet storage for the application and/or the user ID (45).

If the application is previously known, but the user ID supplied is not known (46), then the user may also be prompted to enter a new user ID (46).

Once the wallet manager has received a recognized application and/or user ID, either from the requesting program or by prompting the user, an associated password is retrieved (47) from the wallet storage, the password is auto-typed into the selected field (e.g. spoofing the keyboard buffer or by the application program accepting the password input), and the wallet pop-up dialogue is removed (48).

Figure 5:
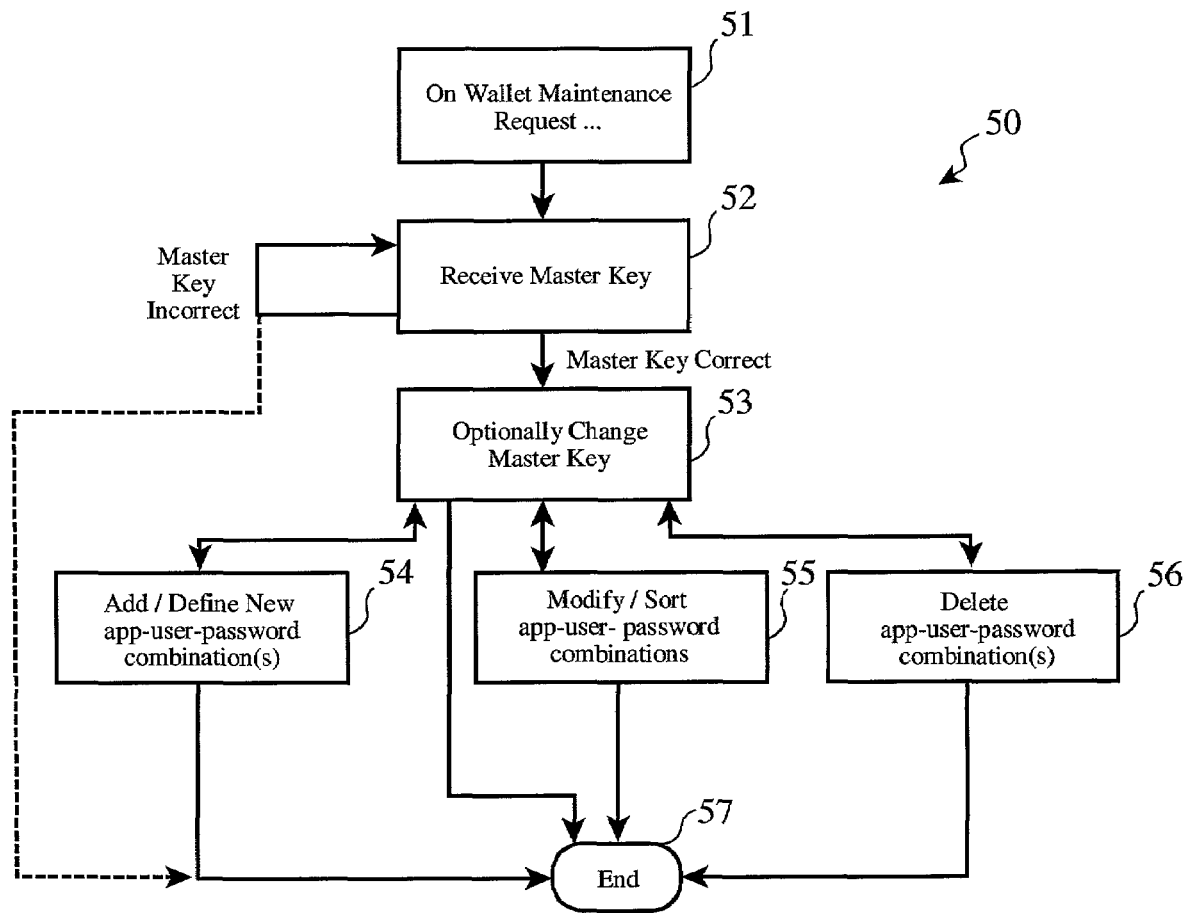
FIG. 5 sets forth the logical process of the wallet maintenance operations of the invention according to the preferred embodiment.

Turning now to FIG. 5, the method of the invention for wallet maintenance is disclosed. Wallet maintenance may be initiated or instantiated (51) by selecting an icon on the user's computer desktop, selection of a special function from a desktop menu, or from an option offered in the previously-disclosed wallet pop-up dialogue.

First, the master key supplied by the user is verified (52). If the master key is incorrect, then the user may be prompted to reenter the master key, or the process may terminate (57).

If the master key is entered correctly, the user may be given options to change the master key (53); add a new application, user ID or password (54); modify, rearrange, or sort the existing application-user-password combinations (55); or delete existing application-user-password combinations (56).

These "maintenance" functions are preferably implemented as part of the wallet direct user interface (33) application program, but may alternatively be realized as web browser functions or extensions, or additions to other application programs.

As such, the interface and request functions to the wallet manager may be implemented as inline code changes to existing application programs, such as word processors, financial management software, etc. Web browsers may also be modified to avail themselves of the wallet manager interface either through inline code changes, or through the use of extensions such as plug-ins. This provides the ability for all computing platform applications, web browsers, and web sites accessed by the user of the computing platform to access a common, centralized and secure password wallet for quick and easy entry of application-specific and/or user_ID-specific passwords.

Although the invention is particularly useful for managing a multitude of passwords, it may also be used to manage other private and non-private data items which are routinely entered by users into programs and web forms, such as credit card numbers, address and telephone numbers, social security numbers, and account numbers.

Figure 6:
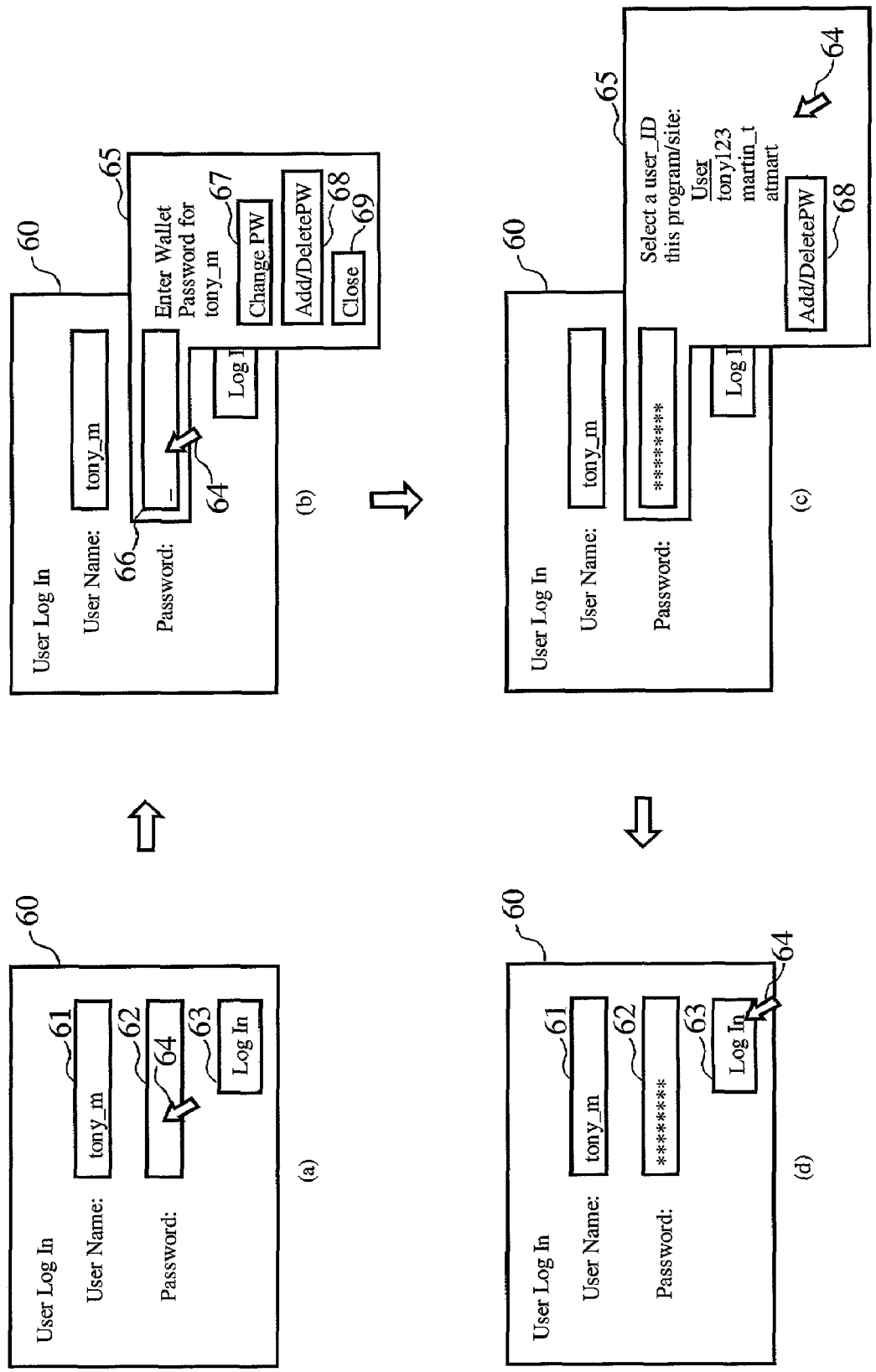
FIG. 6 provides an illustrative example of the use of the invention from a user's perspective.

Turning now to FIG. 6, an example user action and display sequence is given according to the preferred embodiment. When a user is viewing a window, frame or other element of a computing platform display which requires entry of a password (60), for example, he or she may move the pointer (64) over the password field (62), click-into the password field (62), otherwise activate the password field (62) (e.g. Tab into, touch with stylus, etc.), or invoke the password wallet directly (e.g. by right clicking over the field and selecting the password wallet from a context menu for that field). In the illustration of FIG. 6(a), the user has already completed a user name field (61), such as "tony_m".

Upon activation of the password field or password wallet through a method such as these, the wallet manager pop-up dialogue (60) is shown on the display, preferably on top of (e.g. overlaid) the existing window or frame (60) and covering the password field (62), as shown in FIG. 6(b).

The wallet manager pop-up (65) allows the user to enter the wallet master key into the master key field (66), as well as preferably providing user-selectable options to change (67), add or delete passwords (68), or simply close (69) the pop-up to resume normal interaction with the original window (60).

When the user has correctly completed entry of the wallet master key, the wallet manager searches the wallet storage for any and all entries correlating to the application ID and/or user ID, as previously described. If no entries are found which match the user ID and/or the application, then the user may be prompted to create a new entry in the wallet storage, also as previously disclosed. Additionally, if the user has not previously entered a user ID in the original window (60), the wallet manager may prompt the user for a user ID value.

If more than one user is found in the wallet for the application, multiple user ID choices may be provided to the user from which he or she may select, as shown in FIG. 6(c).

The user-selected application- or website-specific (and potentially user-specific) password value (and optionally user ID value) is then automatically entered into the activated field(s) (62) of the original window (60), and the wallet manager pop-up (65) is removed so that the user may proceed with completing the form or logging in, as shown in FIG. 6(d).

Through use of the invention, the user is allowed to maintain an extensive number of user ID's and passwords correlated to specific application programs and web sites, without the burden of having to remember all of them. Additionally, the user does not have to store all of these user IDs and passwords in another computer file, or written on a sheet of paper, which may be found or used by an unauthorized user. By requiring the entry of the correct password wallet master key, the consolidated password list is protected from unauthorized use, while the centralized password storage is accessible from any application program and/or web form.

While certain examples and details of a preferred embodiment have been disclosed, it will be recognized by those skilled in the are that variations in implementation such as use of different programming methodologies, computing platforms, and processing technologies, may be adopted without departing from the spirit and scope of the present invention. Therefore, the scope of the invention should be determined by the following claims.

What is claimed is:

1. A method within a computing platform of graphically providing a secure field value retrieval and entry, wherein said computing platform includes a display device, a field activation device and a user selection device, said method comprising:

providing to a plurality of application programs an interface to request application-specific passwords, said plurality of application programs including at least one web browser program, and at least one non-browser program;

receiving a request from an application program via said interface for input of an application-specific password;

receiving a computing context indicator regarding at least a position of an original entry point for a password as displayed by said requesting application program;

displaying a user first dialogue to receive a master key value from a user, said user dialogue being displayed in a position so as to overlay said original entry point for a password as displayed by said requesting application program;

determining if said master key value is a correct master key value;

retrieving a plurality of field values from a secure field value store which are associated with said requesting application program, said activated field and a user identification;

displaying to a user a second dialogue to receive a selection by said user from said retrieved plurality of field values; and automatically entering said selected field value into said original entry point for said requesting application program.

2. The method as set forth in claim 1 wherein said step of displaying a user dialogue comprises receiving a user identification value.

3. The method as set forth in claim 1 wherein said step of retrieving a field value from a secure field value store which correlates to a computing context comprises retrieving a field value which is associated with an application program.

4. The method as set forth in claim 1 wherein said step of retrieving a field value from a secure field value store which correlates to a computing context comprises retrieving a field value which is associated with a web site.

5. The method as set forth in claim 1 wherein said step of retrieving a field value from a secure field value store which correlates to a computing context comprises retrieving a field value which is associated with a web form.

6. The method as set forth in claim 1 wherein said step of automatically entering said retrieved field value into said activated field comprises automatically entering a password value.

7. A computer readable medium encoded with software for graphically providing a secure field value retrieval and entry, wherein said computing platform includes a display device, a field activation device and a user selection device, said software causing the computing platform to perform the steps of:

providing to a plurality of application programs an interface to request application-specific passwords, said plurality of application programs including at least one web browser program, and at least one non-browser program;

receiving a request from an application program via said interface for input of an application-specific password;

receiving a computing context indicator regarding at least a position of an original entry point for a password as displayed by said requesting application program;

displaying a user dialogue to receive a master key value from a user, said user dialogue being displayed in a position so as to overlay said original entry point for a password as displayed by said requesting application program;

determining if said master key value is a correct master key value;

retrieving a field value from a secure field value store which is associated with said requesting application program, said activated field and a user identification; and automatically entering said retrieved field value into said original entry point for said requesting application program.

8. The computer readable medium as set forth in claim 7 wherein said software for displaying a user dialogue comprises software for receiving a user identification value.

9. The computer readable medium as set forth in claim 7 wherein said software for retrieving a field value from a secure field value store which correlates to a computing context comprises software for retrieving a field value which is associated with an application program.

10. The computer readable medium as set forth in claim 7 wherein said software for retrieving a field value from a secure field value store which correlates to a computing context comprises software for retrieving a field value which is associated with a web site.

11. The computer readable medium as set forth in claim 7 wherein said software for retrieving a field value from a secure field value store which correlates to a computing context comprises software for retrieving a field value which is associated with a web form.

12. The computer readable medium as set forth in claim 7 wherein said software for automatically entering said retrieved field value into said activated field comprises software for automatically entering a password value.

13. A system for graphically providing a secure field value storage, retrieval and entry within a computing platform, wherein said computing platform includes a display device, a field activation device, a user selection device and a data storage medium, said system comprising:

an interface accessible by a plurality of application programs to request application-specific passwords, said plurality of application programs including at least one web browser program, and at least one non-browser program;

a request received from an application program via said interface for input of an application-specific password, including a computing context indicator regarding at least a position of an original entry point for a password as displayed by said requesting application program;

a secure field value store disposed within said data storage medium;

a user dialogue display on said display device adapted to receive a master key value from a user, said user dialogue being displayed in a position so as to overlay said original entry point for a password as displayed by said requesting application program;

a master key value evaluator for determining if a master key value entered via said user dialogue display is a correct master key value for said secure field value store;

a field value retriever for finding in and retrieving from said secure field value store a field value which is associated with said requesting application program and a user identification; and a field value inputter for automatically entering said retrieved field value into said original entry point.

14. The system as set forth in claim 13 wherein said user dialogue display is further adapted to receive a user identification value, and wherein said field value retriever is further adapted to find and retrieve a field value which is associated with a user identification value.

15. The system as set forth in claim 13 wherein said step of retrieving a password from a secure field value store which correlates to a computing context comprises retrieving a field value which is associated with an application program.

16. The system as set forth in claim 13 wherein said step of retrieving a field value from a secure field value store which correlates to a computing context comprises retrieving a field value which is associated with a web site.

17. The system as set forth in claim 13 wherein said step of retrieving a field value from a secure field value store which correlates to a computing context comprises retrieving a field value which is associated with a web form.

18. The system as set forth in claim 13 wherein said step of automatically entering said retrieved field value into said activated field comprises automatically entering a password value.

19. The system as set forth in claim 13 where said field value store is a database.

* * * * *